US010532714B2

United States Patent
Seid

(10) Patent No.: US 10,532,714 B2
(45) Date of Patent: Jan. 14, 2020

(54) SAFETY SWITCHING DEVICE FOR SWITCHING ON AND SAFELY SWITCHING OFF AN ELECTRICAL LOAD

(71) Applicant: PILZ GMBH & CO. KG, Ostfildern (DE)

(72) Inventor: Joerg Seid, Ostfildern (DE)

(73) Assignee: PILZ GMBH & CO. KG, Ostfildern (DE)

( * ) Notice: Subject to any disclaimer, the term of this patent is extended or adjusted under 35 U.S.C. 154(b) by 285 days.

(21) Appl. No.: 15/598,348

(22) Filed: May 18, 2017

(65) Prior Publication Data

US 2017/0253207 A1 Sep. 7, 2017

Related U.S. Application Data

(63) Continuation of application No. PCT/EP2015/077495, filed on Nov. 24, 2015.

(30) Foreign Application Priority Data

Nov. 25, 2014 (DE) .................. 10 2014 117 280

(51) Int. Cl.
*H05B 39/08* (2006.01)
*H01H 3/26* (2006.01)
(Continued)

(52) U.S. Cl.
CPC ............ *B60R 21/017* (2013.01); *B60R 16/03* (2013.01); *H02J 3/14* (2013.01); *H02J 2003/001* (2013.01)

(58) Field of Classification Search
CPC ................ H01H 39/006; H01H 47/004; H02J 2003/001; H02J 3/14; B60R 21/017; B60R 16/03
See application file for complete search history.

(56) References Cited

U.S. PATENT DOCUMENTS 5,877,563 A   3/1999  Krappel et al.
6,262,871 B1  7/2001  Nemir et al.
(Continued)

FOREIGN PATENT DOCUMENTS

DE    24 28 993 A1    1/1976
DE    41 10 240 C1   10/1992
(Continued)

OTHER PUBLICATIONS

Directive 2006/42/EC of the European Parliament and of the Council of May 17, 2006 on machinery, and amending Directive 95/16/EC (recast); 63 pp.
(Continued)

*Primary Examiner* — Jared Fureman
*Assistant Examiner* — Esayas G Yeshaw
(74) *Attorney, Agent, or Firm* — Harness, Dickey & Pierce, P.L.C.

(57) ABSTRACT

A safety switching device for switching on and safely switching off an electrical load, comprising a failsafe evaluation/control unit, an output terminal for providing a potential, a switching element having a first working contact, wherein the potential is connectable to the output terminal via the first working contact, and an input terminal for receiving an input signal for operating the switching element via the evaluation/control unit. Additionally, the safety switching device comprises a separator having a connecting piece, a drive element and a separating element. The drive element is configured to mechanically move the separating element from a first position into a second position and the connecting piece and the first working contact electrically connect in series with one another the potential to the output terminal. Further, in the second position the separating element irreversibly separates the connecting piece into two pieces.

10 Claims, 7 Drawing Sheets

(51) Int. Cl.
*B60R 21/017* (2006.01)
*B60R 16/03* (2006.01)
*H02J 3/14* (2006.01)
*H02J 3/00* (2006.01)

(56) References Cited

U.S. PATENT DOCUMENTS

| | | | |
|---|---|---|---|
| 6,556,119 | B1 | 4/2003 | Lell |
| 8,587,914 | B2 * | 11/2013 | Kamor ................ H01H 71/125 361/115 |
| 2002/0130557 | A1 | 9/2002 | Dickhoff |
| 2003/0011250 | A1 | 1/2003 | Pullmann et al. |
| 2003/0063419 | A1 | 4/2003 | Nemir et al. |
| 2009/0073628 | A1 * | 3/2009 | Nitsche ................ H01H 47/005 361/190 |
| 2010/0032275 | A1 | 2/2010 | Meier |
| 2010/0251692 | A1 * | 10/2010 | Kinde, Sr. ................ F02K 5/026 60/226.1 |
| 2014/0062623 | A1 * | 3/2014 | Fasano ................ H01H 71/2463 335/16 |
| 2015/0340854 | A1 | 11/2015 | Richter et al. |
| 2017/0148597 | A1 * | 5/2017 | Mayer ................ B60K 28/14 |

FOREIGN PATENT DOCUMENTS

| | | |
|---|---|---|
| DE | 4438157 C1 | 12/1995 |
| DE | 199 51 095 A1 | 6/2001 |
| DE | 100 11 211 A1 | 9/2001 |
| DE | 199 54 460 A1 | 9/2001 |
| DE | 10 2004 033 359 A1 | 2/2006 |
| DE | 10 2013 101 050 A1 | 8/2014 |
| EP | 0 725 412 A2 | 8/1996 |
| JP | 2006310324 A | 11/2006 |
| JP | 2010512624 A | 4/2010 |
| WO | WO-0074192 A1 * 12/2000 ........... G01R 31/327 |

OTHER PUBLICATIONS

English translation of International Preliminary Report on Patentability (Chapter I) for PCT/EP2015/077495; dated Jun. 8, 2017; 9 pp.

Japanese Examination Report (English translation included) for Appl'n No. 2017-527900; dated Aug. 22, 2019; 8 pp.

* cited by examiner

SAFETY SWITCHING DEVICE FOR SWITCHING ON AND SAFELY SWITCHING OFF AN ELECTRICAL LOAD

CROSS-REFERENCES TO RELATED APPLICATIONS

This application is a continuation of international patent application PCT/EP2015/077495, filed on Nov. 24, 2015 designating the U.S., which international patent application has been published in German language and claims priority from German patent application DE 10 2014 117 280.9, filed on Nov. 25, 2014. The entire contents of these priority applications are incorporated herein by reference.

BACKGROUND OF THE INVENTION

This disclosure relates to a safety switching device for switching on and safely switching off an electrical load.

Safety switching devices are generally used in the industrial field in order to switch on and safely off electrically driven machines, such as for example a press or a milling machine. Safety switching devices are consequently devices that achieve safety-related functions in control technology and reduce the risk of a threat by a machine to an acceptable level. Safety-related functions are for example emergency off/emergency stop functions, protective door functions or also the standstill monitoring of a drive. In general, a safety switching device monitors a specific function, wherein by interconnecting with further safety switching devices it is possible to ensure that an entire machine or installation is being monitored.

Safety switching devices differ primarily in their technical design. DE 199 54 460 A1 for example describes a classical safety switching device on the basis of contact-based relay technique. In this case, one or multiple safety relays are used in order to switch off an electrical load in an emergency situation for example by switching off the power to said electrical load. The control circuit of the safety relay is for example connected to a potential by an emergency off switch and the working contacts are closed in the normal operation. If the emergency off switch is actuated, the working contacts are opened. It is possible using the working contacts of the relays, said contacts generally being connected in series, to control directly or indirectly a power supply to the monitored machine or installation.

In addition to the classical safety switching devices, safety switching devices are being increasingly used that comprise an electronic evaluation system. The electronic evaluation system can receive and evaluate input signals from different signal transmitters and can also be used to detect faults. These safety switching devices comprise on the output side contact-based potential-free outputs, purely electronic semiconductor outputs or a combination of the two. A fully electronic safety switching device is disclosed for example in DE 100 11 211 B4.

Irrespective of their technical design, all safety switching devices must be designed in such a manner that—when wired correctly—neither a fault in the device nor an external fault caused by a sensor or actuator leads to a loss of the safety-related function. For this purpose, safety switching devices are generally designed with two channels in a redundant manner so that despite a fault in one channel the safety-related function can be safeguarded by a second channel. However, in the case of a two channel structure, so-called common cause failures, which are faults resulting from a common cause, still occur. It is thus possible for example in the case of classical safety switching devices that two relay contacts become welded and consequently both channels become ineffective. This would lead to a complete loss of the safety-related function.

One measure for minimizing the risk of common cause failures is to increase the redundancy. For example, safety switching devices are known that are embodied with three or more channels and this way reduce the effects of common cause failures. Likewise, circuitry solutions are known, which allow different loadings of the switching elements and thereby prevent a simultaneous failure. For instance, DE 199 54 460 A1 describes a safety switching device that is based on relay technique in which the redundant switching relay comprises different nominal switching capabilities. By this measure, the relays switch at different points in time as a result of their construction and as a consequence thereof, in the normal operating mode, at least one switching element is not switched under load. Consequently, the one switching element is exposed to a different, in particular lower loading, as a result of which the probability of a simultaneous failure can be reduced.

The above mentioned approaches for reducing common cause failures are however generally expensive and associated with considerably outlay. In particular, the addition of further redundancy disproportionately increases the production costs in the case of simple safety switching devices. Furthermore, the further redundancy only reduces the probability of a common cause failure. It does not exclude such a failure.

It is known from the prior art to equip electrical devices with fuses that trip in the event of an overcurrent. Known overcurrent protection devices that are also described as OCP (=over current protection) are fusible links, electrical fuses or electromechanical circuit breakers.

With respect to safety switching devices, an overcurrent protection device is known from DE 10 2013 101 050 A1. DE 10 2013 101 050 A1 discloses inter alia a power supply unit that in the event of an overcurrent short-circuits the power supply to a device having a ground connection. Such a circuitry is generally also described as a "crowbar" circuit. The short circuit leads to a power increase in the power supply, as a result of which a fusible link that lies in series in the power supply trips and the power supply is disconnected. As a result, the safety switching device is physically separated from the power supply so that it can no longer pose a danger. However, such a "disconnection" of the power supply also leads to any control over the safety switching device being lost. In particular, once the safety device has tripped, the safety switching device is no longer able to perform any diagnostic function, in other words the safety switching is no longer able to report its own failure to a higher-ranking controller, nor can a higher-ranking controller directly enquire a reason for the failure from the switching device. This is in particular problematic with respect to a complex installation having a multiplicity of safety switching devices.

Further overcurrent protection devices that are based on an electromechanical principle are known for example in the automotive industry. For instance, DE 41 10 240 C1 and EP 0 725 412 A2 disclose safety devices for protecting a main current path in a motor vehicle. Likewise, a current path is monitored here in order to detect an overcurrent and in the event that a specific current strength is exceeded, the current path is physically capped by a separating element. Due to the high currents that occur when the main current path is short circuited, it is proposed to provide in addition to an electromechanical actuator inter alia also a separating element that is provided with a detonator and can break a main current line rapidly and reliably. The separator and a corresponding sensor for determining the current in the main current path are provided as close to the battery of the vehicle as possible so that in the event of a fault the entire onboard power supply can be preferably disconnected. However, it is also a disadvantage in the case of these protective devices that once the main current path has been disconnected, the safety device is itself no longer able to perform any diagnostic function.

SUMMARY OF THE INVENTION

It is an object of this disclosure to provide an alternative safety switching device for switching off a machine in a failsafe manner. It is further an object of this disclosure to provide a safety switching device that offers a particular high degree of safety with respect to common cause failures and other faults within the safety switching device. Furthermore, it is an object of this disclosure to provide a safety device that is more cost-effective.

According to one aspect of this disclosure, there is provided a safety switching device for switching on and safely switching off an electrical load, comprising a failsafe evaluation and control unit, an output terminal for providing a potential, a switching element having a first working contact, via which the potential is connectable to the output terminal, an input terminal for receiving an input signal for operating the switching element via the evaluation and control unit, and a separator having a connecting piece, a drive element and a separating element, wherein the drive element is configured to mechanically move the separating element from a first position into a second position, wherein the connecting piece and the first working contact electrically connect in series with one another the potential to the output terminal, and wherein in the second position the separating element irreversibly separates the connecting piece into two pieces.

According to a further aspect of this disclosure there is provided in a safety switching device comprising an output terminal for providing a potential and a switching element having a first working contact, via which the potential is connectable to the output terminal, a separator comprising a connecting piece, a drive element and a separating element, wherein the drive element is configured to mechanically move the separating element from a first position into a second position, wherein the connecting piece and the first working contact in series with one another electrically connect the potential to the output terminal, and wherein in the second position the separating element irreversibly breaks the connecting piece into two pieces Therefore, it is an idea to provide a further separator for a safety switching device that can trigger a safety-related function in the event of a failure of one or more elements of the safety switching device. The separator is based intentionally on a different working principle than the other elements of the switching device in order to exclude failures that have a common cause. Therefore, the novel separator not only increases the redundancy but rather provides diversity by which in a simple manner it is possible to exclude a failure resulting from a common cause failure.

In particular, the separator is designed as an irreversible one-way switch, which, if triggered, physically destroys a structure of the switching device in such a manner that it is not possible to restart the technical installation in the unsafe state. Therefore, the novel separator is based on the principle of "ultima ratio" and as a last resort places the safety switching device directly into a safe state, preferably without being dependent upon an external energy supply. At the same time, when triggering the separator, complete loss of control over the safety switching device itself will not take place, as would be the case when triggering a safety device in the energy supply of the safety switching device. On the contrary, the safety switching device in the preferred embodiment remains completely capable of performing a diagnostic function even after the separator has been triggered. This is particularly advantageous if the safety switching device is part of a complex assembly or is itself embodied in such a manner that in addition to the one safety-related function further functions can be carried out by the safety switching device. Particularly, it is advantageous for programmable safety controllers, in which the switching device is designed as a module of the controller, that, even if the "ultima ratio" of an individual safety-related function is triggered, the controller remains capable of functioning.

Furthermore, the novel separator can be used in a multiplicity of safety switching devices having different designs. It is thus possible to use the separator according to the present disclosure both for classical contact-based safety switching devices using relay technology and also for fully electronic devices having semiconductor outputs. As a result of these diverse possible uses, the novel separator is also more advantageous, in particular with respect to the large number of components, than safety switching devices that achieve diversity by using different components having the same function, since the novel separator requires overall fewer components to be kept in store.

The novel safety switching device and the novel separator are thus safe and more cost-effective than known solutions from the prior art.

In a refinement, the drive element moves the separating element from the first position into the second position if the switching element experiences a malfunction, in particular welded working contacts. It is preferred that the evaluation and control unit is configured to detect the malfunction and in dependence thereon to control the drive element so as to move the separating element from the first position into the second position.

In this refinement, the drive element of the separator is coupled directly or indirectly to the switching element. In particular, the drive element is connected to the controller of the switching element so that in the event of a malfunction of the switching element the drive element triggers and activates the safety-related function via the separating element. For example, it is conceivable for safety switching devices using relay technology that two working contacts weld and fail simultaneously. While it is possible to detect such a failure, conventional safety switching devices provide no solution for it. By coupling the novel separator to the switching element controller, it is possible to provide in a simple manner a solution in the case of a dangerous welding of the working contacts.

In a further refinement, the safety switching device comprises an operating power for moving the separating element from the first position into the second position, wherein the operating power is stored in the drive element.

In this refinement, an operating power, preferably in the form of mechanical or thermal energy, is stored in the drive element itself. Thereby, the separator can trigger even if the normal power supply of the safety switching device, for instance a voltage supply fails. The novel safety switching device is thus particularly robust and protected against failures.

In a further refinement, the drive element comprises a fuel and an ignition device.

In this refinement, the drive element is comprises a fuel that is ignited by an ignition device in order to trigger the drive element. By combusting the fuel, the separating element is moved and the connecting piece is irreversibly separated into two pieces in a particularly effective manner. The separator is thus activated by a completely different mechanism than the switching elements used for providing the potential to the output terminals. The greater the functional difference between the separator and the switching elements, the lower the probability of a common cause failure. Therefore, by these measures a particularly high level of diversity is achieved.

In a further refinement, the drive element comprises fuel that combusts at a rate that is lower than the sound velocity in the fuel.

In this refinement, the separating element is set in motion by combusting the fuel, wherein the fuel or the quantity of fuel is selected so that said fuel combusts at a rate lower than the sound velocity within the fuel. Consequently, no detonation but deflagration of the fuel occurs. Thereby, rapid combustion occurs with the explosion pressure being only produced by the expanding gases. For deflagration, the combustion pressure is mostly in the order of 10 bar. The pressure that arises causes the separating element to move and the connecting piece is separated in a reliable and rapid manner without an excessive danger for an operator resulting from the combustion.

In a further refinement, the safety switching device comprises a further or multiple connecting pieces which are separated mechanically and irreversibly in two if the separating element is in the second position.

In this refinement, a further or multiple connecting pieces are physically destroyed by the separating element. Thus, in a simple and cost-effective manner multiple current paths are reliably disconnect by an individual separator.

In a further refinement, the safety switching device comprises a second switching element, having a second working contact that is connected in series to the first working contact and the connecting piece.

In this refinement, the safety switching device is thus embodied with two channels having the separator as an additional protection. In this embodiment, the irreversible protection consequently only comes into effect if the redundant switched elements fail. This is particular advantageous since thereby the safety switching device is only disabled in a few special cases, for instance, when the working contacts of both switching elements weld together at the same time.

In a further embodiment, the safety switching device comprises a further drive element that can move the separating element independently of the drive element.

In this embodiment, the drive element is designed in a redundant manner, in other words the separator comprises two separate trigger mechanisms. Thereby, the redundant design of the switching elements, which is usually applied for a safety switching device, becomes obsolete. Consequently, the safety switching device can be of double channel design, wherein the additional safety is achieved by a double design of the drive element. Thereby for instance, a space consuming mechanical switching relay can be replaced advantageously by a smaller second drive element, whereby a safety switching device can be produces cost-effectively and smaller in size.

In a further refinement, the safety switching device comprises a circuit board on which the switching element and the separating element are arranged.

In this refinement, the switching element and the separator are arranged on a single circuit board. Thereby, the safety switching device can be produced particularly small. Preferably, all electronic components of the safety switching device including the separator can be allocated on the single circuit board.

In a further refinement, the safety switching device comprises a circuit board having at least one conductor track, wherein the connecting piece is a section of the at least one conductor track.

In this refinement, the connecting piece is consequently a part of the conductor track which can be separated into two pieces by the separating element. The conductor track provides the electrical connection between the potential, the working contacts of the switching elements, the connecting piece and the output terminal. In other words, the conductor track forms a current path that can be switched by the safety switching device, wherein the connecting piece is a part thereof. Thereby, additional components are advantageously not required for the connecting piece so that the separator can be produced particularly cost-effective.

It goes without saying, that the above mentioned features and features that are yet to be described hereinafter are not only used in the respective described combination but rather they can also be used in other combinations or in a standalone arrangement without departing from the scope of this disclosure.

DETAILED DESCRIPTION OF THE PREFERRED EMBODIMENTS

Figure 1:
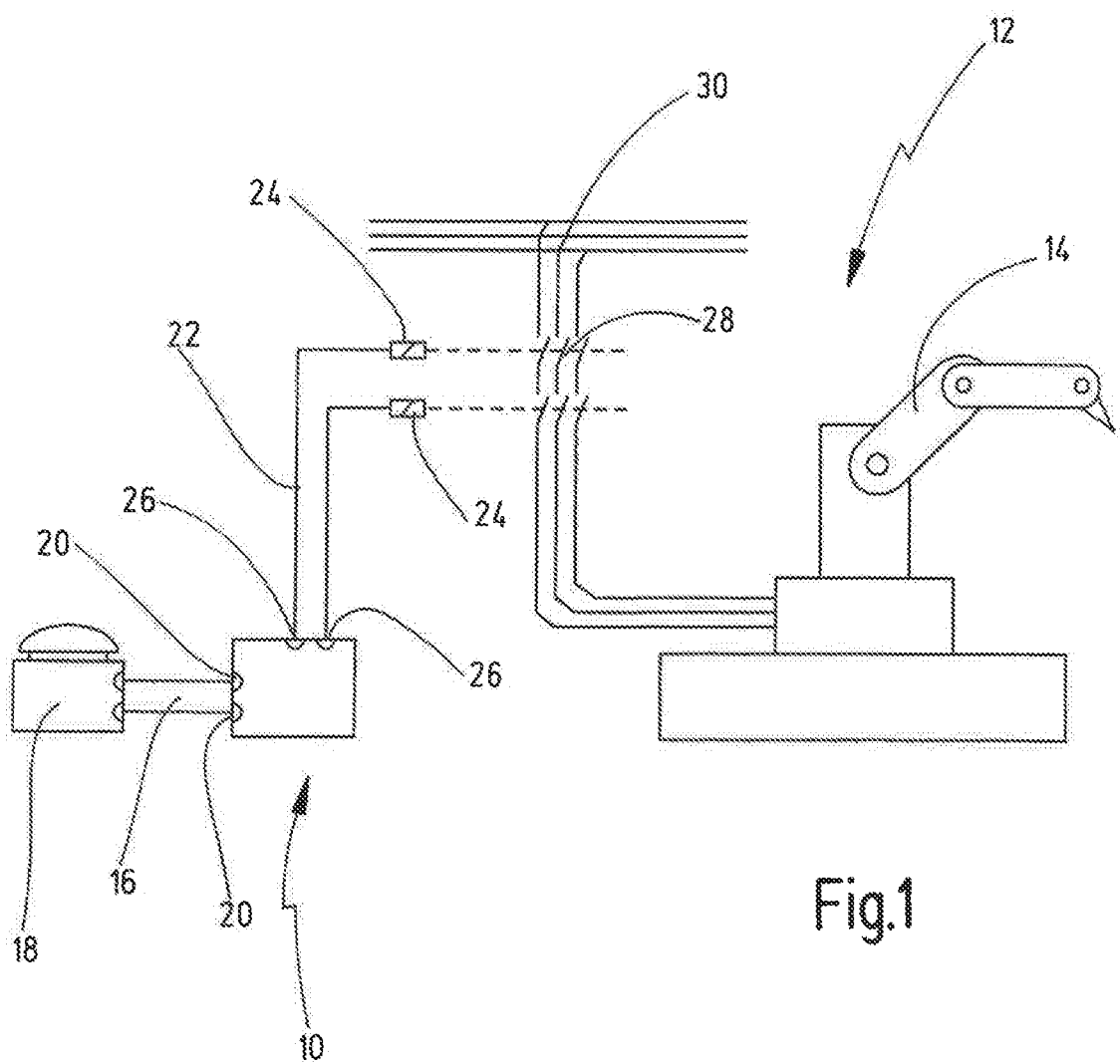
FIG. 1 illustrates a simplified view of a preferred field of application of the novel safety switching device.

FIG. 1 illustrates a preferred field of application of the novel safety switching device 10. The safety switching device 10 is used here to protect a technical installation 12 that is indicated by an automated robot 14. It goes without saying that the invention is not limited to monitoring such a particular installation. On the contrary, the term "electrical load" used in this document is understood to refer to any machine in terms of the machine directive 2006/42/EC. FIG. 1 illustrates in particular the use of the novel safety switching device 10 for achieving an emergency shutoff function. To the same extent, the novel safety switching device can be used also for other safety-related functions, such as emergency stop, protective door functions or standstill monitoring of a drive.

In the present exemplary embodiment, the safety switching device 10 is connected by wires 16 to an emergency off button 18. The emergency off button 18 is configured to provide an input signal by the wires 16 to the input terminal 20 of the safety switching device, for example, by passing thru a potential in the non-actuated state to the input terminals 20. However, in another embodiment, the input signal could also be provided directly by another signal generator, such as a light barrier, a light grid or a contact switch as a so-called OSSD (output signal switching device) signal.

On the output side, the safety switching device 10 controls over further wires 22 external contactors 24, wherein during normal operation a potential is provided at the output terminal 26 so that the contactors 24 are energized and their normally on contacts 28 are closed. The normally on contacts 28 of the contactors 24 are arranged in series to a power supply 30 of the technical installation 12.

The safety switching device 10 is, as further explained with reference to the following drawings, configured to provide depending on the input signal at the input terminals 20 a potential at the output terminals 26 in order to power the contactors 24. If the emergency off button 18 is actuated, the input signal changes, whereupon the safety switching device disconnects the output terminal 26 from the potential so that the external contactors 24 switch off. The technical installation 12 is subsequently disconnected from the power supply and placed in a safe state. It goes without saying that controlling external contactors is only one possibility of placing a machine in a safe state. As an alternative, a change in potential at the output terminals 26 can also be considered as a binary output signal by which the other measures can be triggered to protect persons and material.

Figure 2:
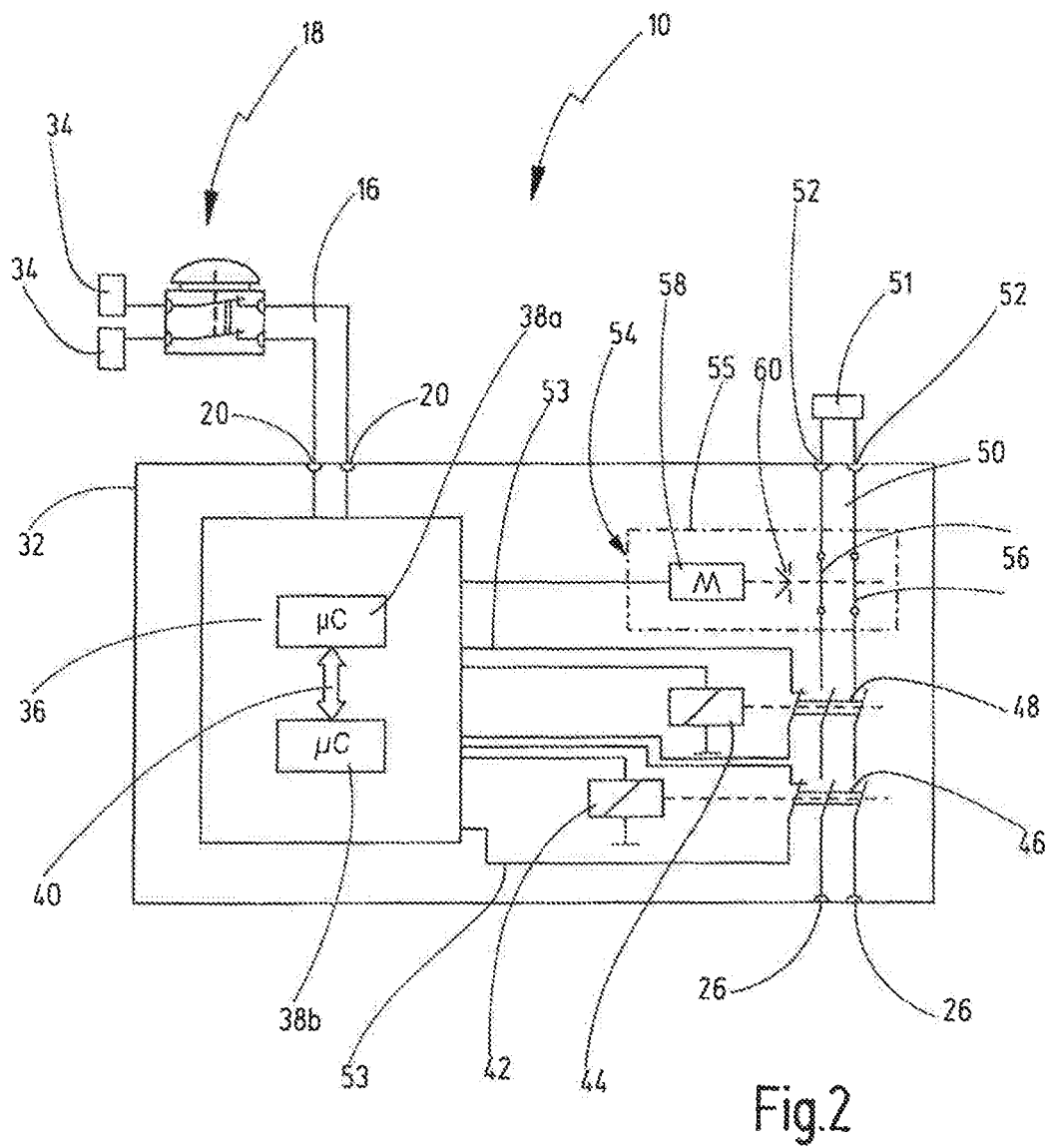
FIG. 2 illustrates a schematic view of a preferred exemplary embodiment of the novel safety switching device.

FIG. 2 illustrates a preferred exemplary embodiment of the novel safety switching device 10. Same reference numerals describe same parts as in FIG. 1.

The safety switching device 10 is arranged here in a housing 32, not further illustrated. The various terminals of the safety switching device are connectable by input and output terminals 20, 26 on the housing 32. For example, an emergency off button 18 is connected in this exemplary embodiment to the safety switching device 10 by wires 16. The emergency off button 18 is here a switching element having two working contacts that are positively driven towards one another and in each case pass through a potential 34 at the input terminals 20 during normal operation.

The input terminals 20 are connected to an evaluation and control unit 36. The evaluation and control unit 36 is comprises here two microcontrollers 38a, 38b that evaluate an input signal at the input terminals 20 in a failsafe manner and provide corresponding control commands. As indicated in the drawing by the arrow 40, the microcontrollers 38a, 38b are configured to monitor one another. Preferably, the microcontrollers 38a, 38b are produced by different manufacturers, as indicated by the cursive caption, so that failures resulting from common cause failures can be avoided within the microcontrollers 38a, 38b.

In this preferred embodiment, a first and a second switching element 42, 44 are controlled by control commands. The first working contact 46 of the first switching element 42 and the second working contact 48 of the second switching element are connected in series in a current path 50 and a potential can be provided at the output terminals 26 by said working contacts. The current path 50, the first working contact 46 and the second working contact 48 are designed in a redundant manner in this embodiment. Thus, the working contacts 46, 48 comprise two contact bridges that are positively driven towards one another and can be moved by the switching elements 42, 44 so as to open or to close the current path 50. The potential 51 that is provided at the output terminals 26 is supplied to the current path 50 in this example from the outside by further terminals 52. In other embodiments, this potential can be provided directly by the safety switching device 10 itself.

During normal operation, when the emergency off button 18 is not pressed, the potential 34 is applied to the input terminals 20. The evaluation and control unit 36 evaluates the potential at the input terminals 20 and controls the switching elements 42, 44 so that the current path 50 is connected and the potential 51 from the terminals 52 is provided to the output terminals 26. If the emergency off button 18 is pressed, the potential 34 is no longer provided at the inputs 20, whereupon the evaluation and control unit 36 controls the switching elements 42, 44 and opens the current path 50. Consequently, a potential 51 is no longer available at the output terminals 26, whereupon, for instance, external contactors switch off and a technical installation, as previously described with regard to FIG. 1, may be stopped in a failsafe manner.

In the shown embodiment, the essential components are provided in a redundant manner, in other words the safety switching device 10 comprises a first and a second channel, wherein the channels may be designed independently from one another to execute the safety-related function, for instance, providing a potential at the output terminals for controlling the external contactors. Additionally, functioning of the switching elements 42, 44 may be verified by a positively-driven return circuit 53 of the working contacts 46, 48 to the evaluation and control unit 36. Overall, it is thus possible in the event of a fault in one of the channels not only to ensure that the technical installation is switched off safely but also to detect a fault within one of the channels.

Furthermore, the safety switching device 10 comprises a separator 54 that is encapsulated in some embodiments in a dedicated housing 55 having electrical contacts. The separator 54 comprises at least one connecting piece 56 that is being part of the current path 50. In the illustrated embodiment, a separate connecting piece is provided for each channel of the current path 50. Furthermore, the separator 54 comprises a drive element 58 and a separating element 60. The separating element 60 is indicated here in the block diagram in its function by a pawl and is further explained with reference to FIG. 3.

The drive element 58 is connected here to the evaluation and control unit 36 and can be activated by said unit by a control command. It is not absolutely necessary that the evaluation and control unit 36 performs the control procedure. In other embodiments, the drive element 58 can be coupled directly to the previously mentioned return circuit 53 or the switching elements themselves in order for example to detect a malfunction thereof. As soon as the drive element 58 is activated, it moves the separating element 60 from a first position into a second position, as is further explained with reference to FIGS. 3a and 3b. Thereby, the separating element 60 irreversibly separates the connecting piece 56 and does not allow it to be reset, as indicated by the pawl. In other words, upon activation the separator 54 physically disconnects the current path 50 and executes independently of the switching elements 42, 44 the safety-related function. Thereby, the output terminals 26 are irreversibly disconnected from the potential.

Preferably, the separator 54 is only controlled and activated if a failure occurs in both channels, for instance, if the working contacts of the first and the second switching elements 42, 44 weld at the same time. The working principle of the separator 54 is thereby fundamentally different to the working principle of the switching elements 42, 44. The switching elements 42, 44 are preferably designed according to a "closed current relay" principle, in other words, during normal operation they are switched to active and their working contacts are closed. In contrast, the separator 54 is passive in the normal operation and is only switched on if required. Consequently, the separator 54 not only advantageously increases the redundancy but also increases the diversity of the safety switching device 10.

Figure 3A:
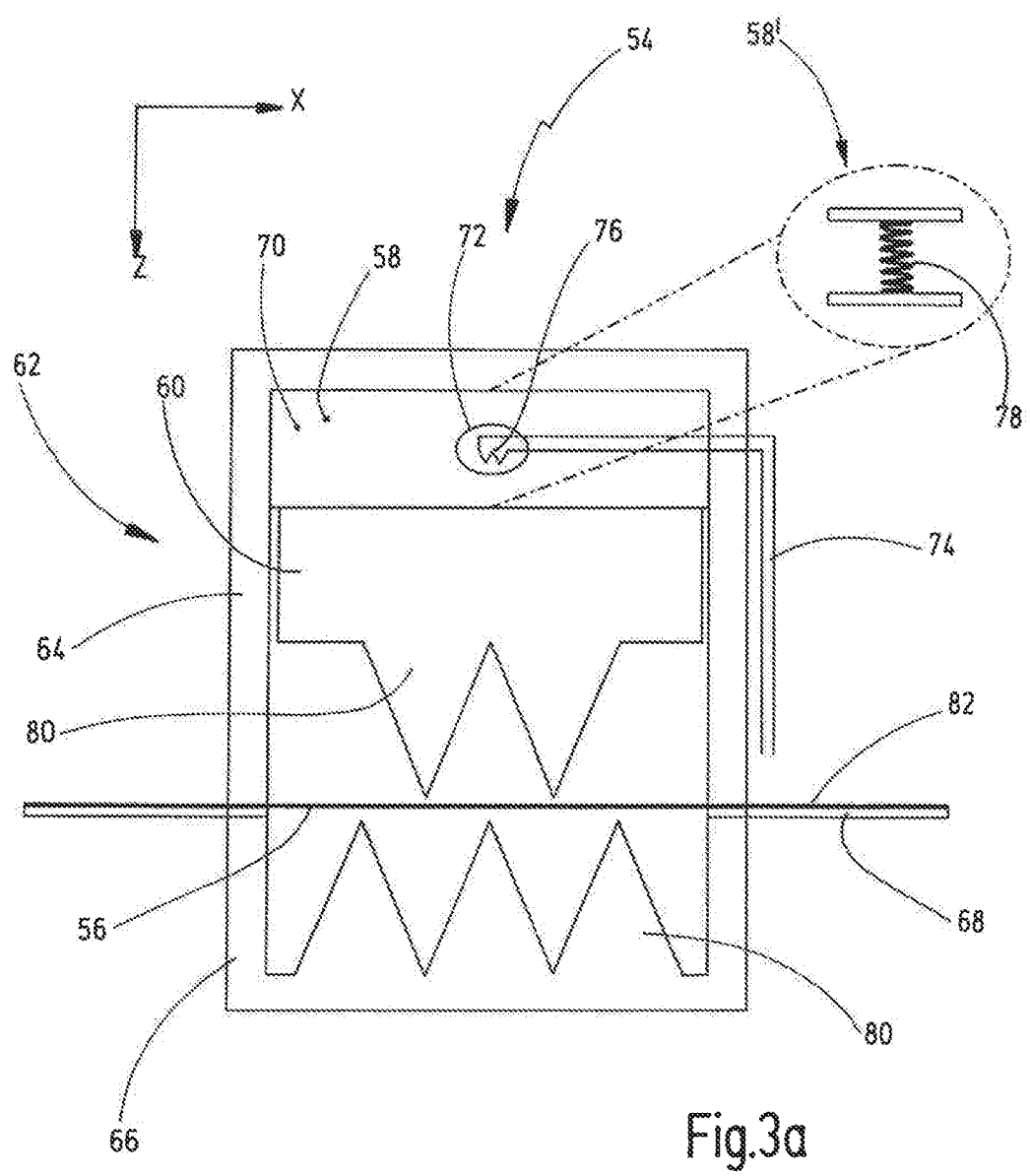
FIG. 3a illustrates a cross-sectional view of an exemplary embodiment of the novel separator in the non-actuated state.
Figure 3B:
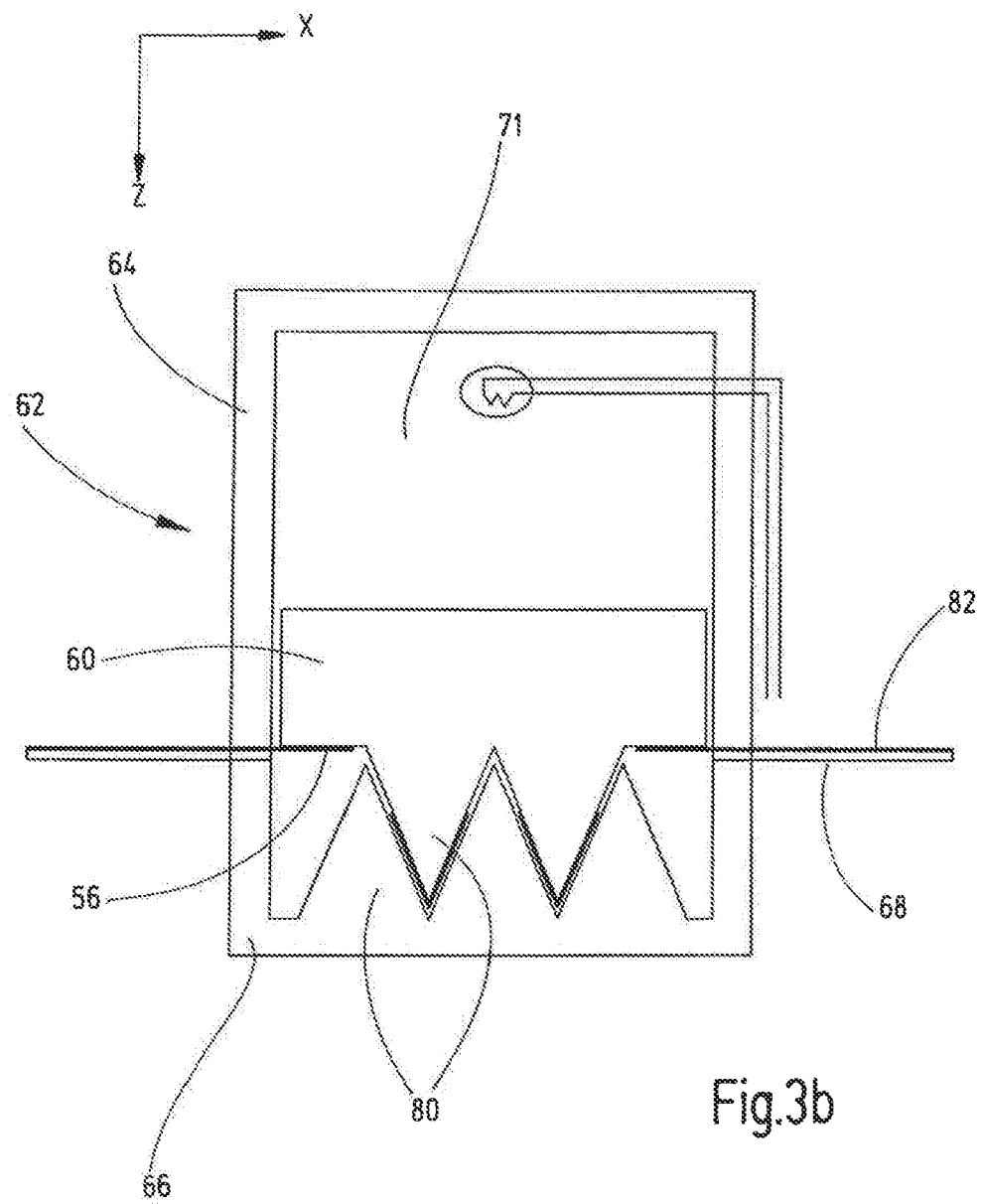
FIG. 3b illustrates a cross-sectional view of an exemplary embodiment of the novel separator in the actuated state.

The FIGS. 3a and 3b depict a preferred embodiment of the novel separator 54 in a standby state and in an activated state. The novel separator 54 comprises a housing 62 having an upper part 64 and a lower part 66. The upper and lower part 64, 66 are preferably a cylindrical hollow body having an open and a closed end face. The open end faces are arranged on opposite-lying faces of a circuit board 68 so that the upper and lower part 64, 66 form a closed cylindrical housing 62, wherein the circuit board 68 preferably intersects the housing 62 in a parallel to the end faces.

In this preferred embodiment, a drive element 58 in form of an ignitable fuel 70 is arranged in the upper part 64. The fuel 70 is preferably arranged flat on the base of the cylindrical upper part 64 of a suitable container. The fuel 70 can be for example a fuel in a solid or semi-solid form that is pressed into the upper part 64. Sodium azide ($NaN_3$) compounds, as used in current air bags of motor vehicles, are one example of such a fuel. Moreover, an ignition device 72 is provided to ignite the fuel 70 which can be triggered, for instance, in an electrical manner, as indicated in the drawing by the lines 74 and the ignition coil 76. As an alternative, the drive element may be of mechanical design, for instance, a resilient spring 78, as indicated in the drawing by the broken line with the reference numeral 58'.

In a particular preferred embodiment, the evaluation and control unit 36 continuously determines the impedance of the ignition device 72. Thereby, functioning of the separator 54 can verified in a simple manner. Furthermore, the switching capability of the control circuit of the ignition device 72 can be tested using short current pulses. Overall, a high probability rate of detecting failures of the ignition device 72 can be ensured which makes it possible to acquire a high safety integrity level (SIL).

Moreover, a separating element 60 is arranged in the upper part 64, which is preferably designed to fit into the cylindrical upper part 64 so that it completely covers the fuel 70. Furthermore, tapered tips and spikes 80 are arranged on the face, which is remote from the fuel 70, of the separating element 60, said tips and spikes pointing in the direction of the circuit board 68. The lower part 66 lies opposite the upper part 64 in a precision-fit manner and comprises tips and spikes that lie on the base and are arranged in such a manner that the tips and spikes of the separating element 60 can engage therein. A connecting piece 56 is arranged in between the tips and spikes of the upper and lower part 64, 66. Preferably, the connecting piece 56 is a continuation of one or more conductor tracks 82 of the circuit board 68. The conductor track or tracks 82 are a part of the current path 50 (FIG. 2) that connects the potential to the output terminals 26 (FIG. 2). Particular preferably, the region of the circuit board 68 that lies within the housing 64 is at least in part of a flexible and easily separable material. For example, the conductor tracks 82 may be arranged in this region on a carrier foil 84 (FIG. 4) made from polyester or polyimide.

As further explained with reference to FIG. 3b, the drive element 58 and the separating element 60 cooperate with one another and are configured to irreversibly separate the conductor track or tracks 82 of the connecting piece 56. FIG. 3b illustrates the exemplary embodiment of FIG. 3a after the fuel 70 has combusted. The combustion process is preferably a deflagration process which is a fast combustion wherein the explosion pressure only results from the produced and expanding gases. Thereby, the combustion pressure is mostly in the order of 10 bar. The combustion occurs at a rate lower than the sound velocity in the combusting medium 70. The separating element 60 is pushed from the upper part 64 into the lower part 66 as a result of the pressure of the combustion gases 71 which cannot otherwise escape the closed housing 62. The protruding tips and spikes 80 cut thru the connecting piece 56 and separate the conductor track or tracks 82 into two or more parts.

In contrast to switching elements that are usually used to control a safety-related function of a safety switching device, such as switching relays, the disclosed separator functions as a one-way switch whose actuation cannot be reversed. Moreover, in contrast to a relay the separator is actively switched on in order to execute the safety function, whereas usually in the case of safety switching devices closed current switches are used, in other words switches that do not execute the safety function in the presence of a current on the control circuit but it the absence of such current.

The energy that is required to move the separating element 60 is advantageously contained in the novel separator 54 itself, in other words the separator 54 can move the separating element 60 preferably independently of an external power supply. The energy is for example contained in the fuel 70 or alternatively in a compressed resilient spring 78 if the drive element 58 of the separator 54 is based on a mechanical principle. Consequently, the separator 54 can preferably execute the safety function if for example a voltage supply to the safety switching device malfunctions or fails and simultaneously a fault in the working contacts 46 or 48 is detected.

Figure 4:
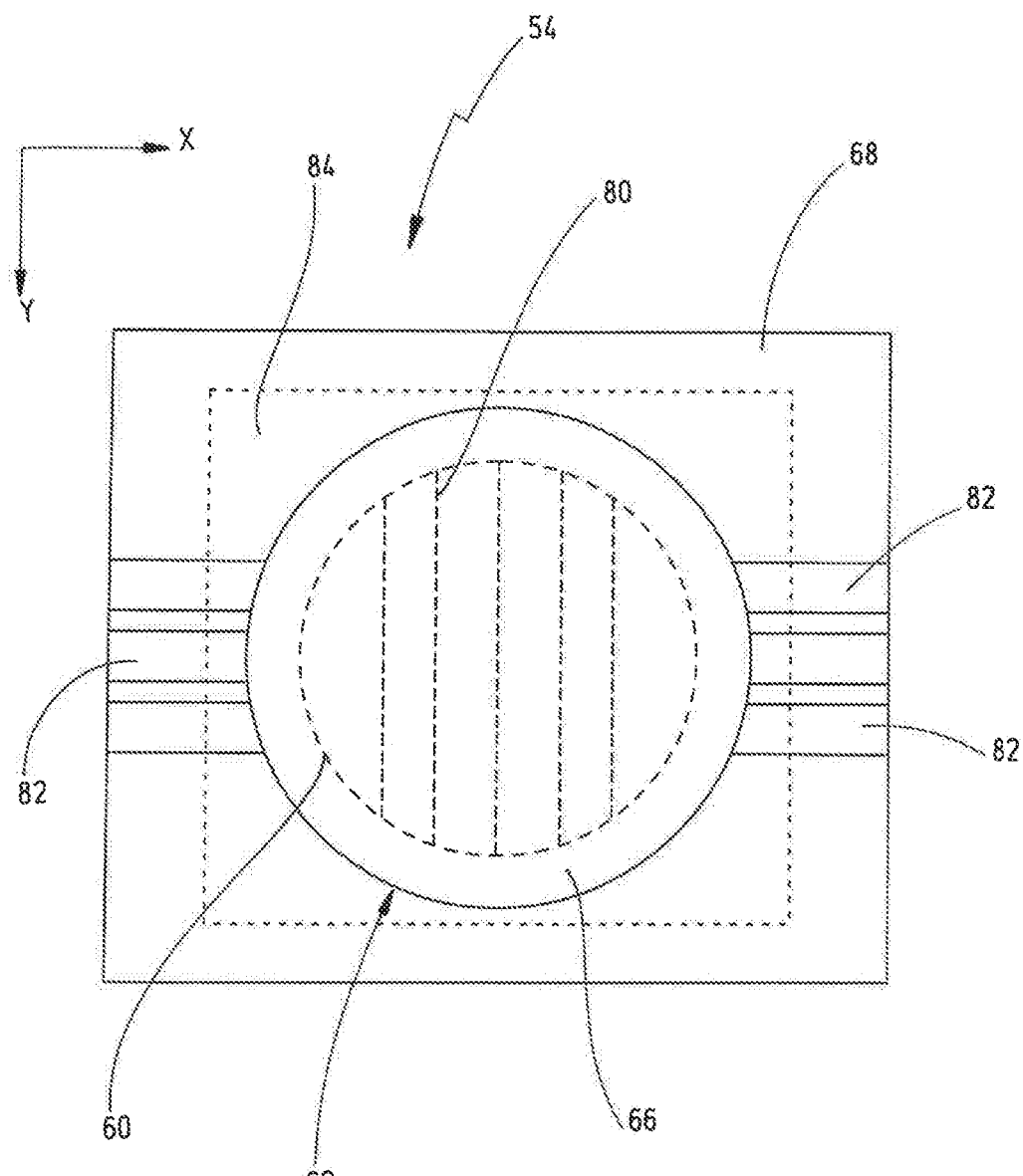
FIG. 4 illustrates an exemplary embodiment of a novel separator in a plan view.

FIG. 4 illustrates a plan view of the exemplary embodiment of FIGS. 3a and 3b. FIG. 4 illustrates from this perspective the cylindrical upper part 66 that is placed on a circuit board 68. It goes without saying that only a section of the circuit board 68 is illustrated in the drawing, wherein preferably also the other electronic or electromechanical components of the safety switching device 10 can be arranged completely or in part on the circuit board 68. Sections of the circuit board 68 are illustrated in this drawing as a foil 84 as indicated by the broken box.

The upper part 66 encompasses in the drawing all three conductor tracks 82. The conductor tracks 82 are part of a switchable current path of the safety switching device 10. The separating element 60 is arranged within the upper part 66 and is thus not visible from the outside, and the tips and spikes 80 of said separating element are indicated in the drawing by the broken lines. As previously described with regard to the FIGS. 3a and 3b, the separating element 60 is configured to separate the foil 84 and the conductor tracks 82 that are located on said foil. In the present embodiment, the separating element 60 is pushed against and through the foil 84 as a result of the deflagration of fuel which is arranged on the housing base of the upper part 66. The connecting piece 56 is in this case a conductor track on a flexible piece of the circuit board. It goes without saying that the invention is not limited to the three conductor tracks 82 as illustrated in the drawing. Likewise, it is not necessary to arrange the conductor tracks on the surface of the circuit board 68 or the carrier foil 84. In other embodiments, the separator 54 separates one or more conductor tracks 82 that are arranged on different sides or in different layers of the circuit board 68.

Moreover, the invention is not limited to the embodiment of the novel separator 54 as illustrated in FIGS. 3a, 3b and 4. Alternatively, the novel separator could be of mechanical design, for instance, in the form of a resilient spring. Furthermore, the separator is not limited to separate a part of a conductor track. In other embodiments, the connecting piece 56 could also be a separate connection section whose ends are connected to the current path 50. Thus, the separator could in another embodiment irreversibly separate a connection in the form of a wire.

Figure 5:
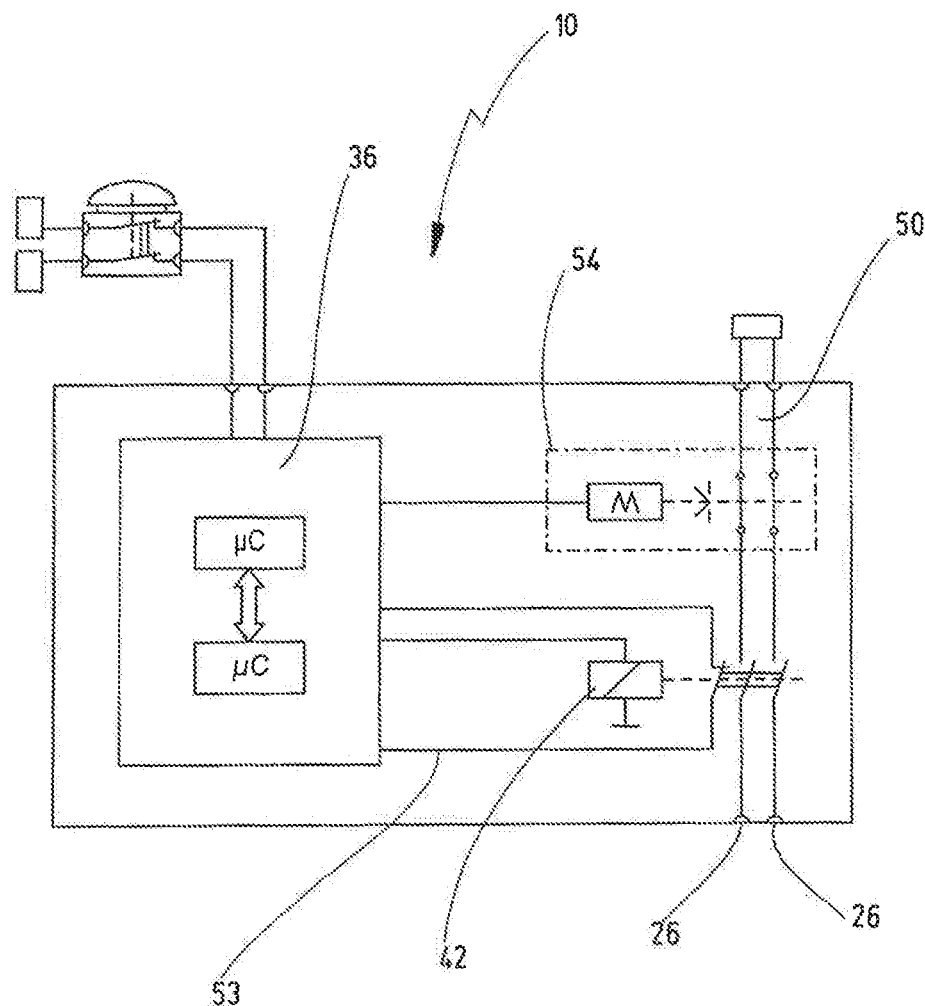
FIG. 5 illustrates a schematic view of a further exemplary embodiment of the novel safety switching device.
Figure 6:
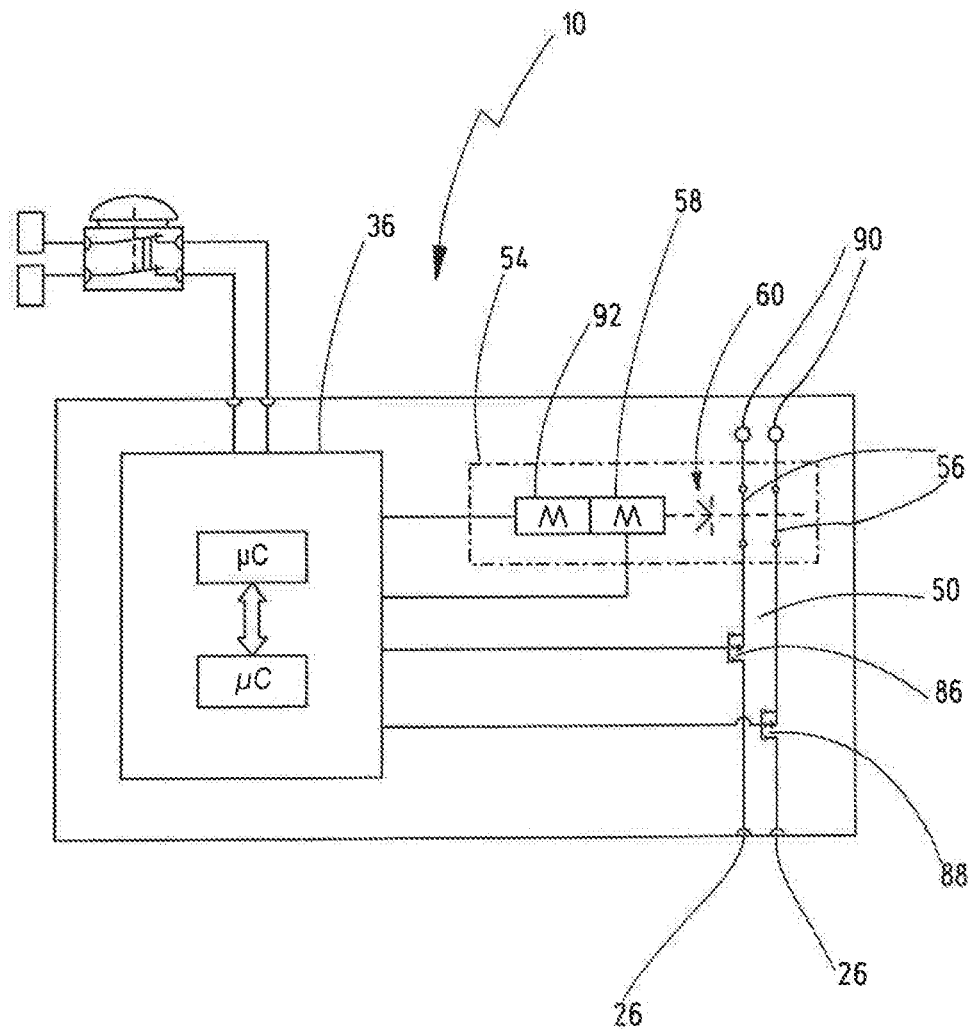
FIG. 6 illustrates a schematic view of a further exemplary embodiment of the novel safety switching device with a redundant separator.

With reference to FIGS. 5 and 6, two further exemplary embodiments of the novel safety switching device 10 are described hereinafter. The same reference numerals denote the same parts as in the embodiments before.

FIG. 5 illustrates a simplified safety switching device 10 in comparison to the embodiment of FIG. 2. The otherwise identical designs differs in that in this embodiment the safety switching device 10 is designed with a single channel comprising only one switching element 42. Instead of a redundant second switching element, a separator 54 according to the present disclosure is arranged in the current path 50 in order to ensure the necessary fail-safety. In other words, the switching element 42 is in this embodiment used primarily for switching the current path 50 on and off and consequently for providing a corresponding potential at the outputs 26, whereas the separator 54 provides the secondary safety function. Preferably, the separator 54 is coupled for this purpose to a corresponding return circuit 53 that connects the working contacts of the switching element 42 to the evaluation and control unit 36 in order to detect a failure in the switching element 42, and in the event of a failure to activate the separator 54. Thus, in this embodiment it is possible to advantageously do without a second redundant switching element, in which case the safety switching device 10 can be produced particularly small in size and in a cost-effective manner.

FIG. 6 depicts a further embodiment of the novel safety switching device having a separator 54 according to the present disclosure. The safety switching device 10 is based on the same principle as the safety switching device according to FIG. 2, wherein in this embodiment the current path 50 is connected by a first and a second semi-conductor switching element 86, 88. Furthermore, the potential that is connected by the current path 50 to the outputs 26 is provided in his embodiment internally as indicated in the drawing by reference numeral 90. It goes without saying that alternatively the potential may also be provided externally. The first and the second semi-conductor switching element 86, 88 are configured to connect the potential 90 to the outputs 26.

Furthermore, the separator 54 in this embodiment comprises a further drive element 92. The drive element 58 and the further drive element 92 act independently of one another on the separating element 60. For instance, in a separator 54, as described with regard to the FIGS. 3a, 3b and 4, a second region could be implemented having additional fuel along with a further ignition device by which this fuel can be ignited. In another embodiment, the further drive element 92 may also apply a different working principle than the drive element and may, for instance, be implemented mechanically using a resilient spring allowing thereby the diversity of the safety switching device to be further increased. The drive elements 58, 92 are preferably connected in each case separately to the evaluation and control unit 36.

The separating element 60 upon which the drive elements 58, 92 act separates the connecting piece or the connecting pieces 56 in the current path 50 into two pieces as previously described. In other words, in this embodiment, a redundancy with regard to the semi-conductor switching elements 86, 88 is achieved by the double design of the drive element 58, 92. As is explained with regard to the embodiment according to FIGS. 3a, 3b and 4, such a redundant design of the drive elements is possible in a simple and cost-effective manner.

It goes without saying, that there are numerous variation possibilities of the described embodiments. Likewise, the separator according to the present disclosure is not limited to be use in the safety switching devices as illustrated herein. Alternatively, the separator according to the present disclosure can also be used for other safety devices, such as configurable or programmable safety in order to protect their specific output circuits by an additional mechanism. In particular, dedicated output modules of such safety switching devices can comprise a separator according to the present disclosure.

Overall, the novel separator allows on the one hand an increased redundancy and on the other hand an increased diversity of a safety switching device. Alternatively or in addition thereto, the novel separator make it possible to simplify the hitherto available safety switching devices so that said devices can be produced smaller in size and in a cost-effective manner.

What is claimed is:

1. A safety switching device for switching on and safely switching off an electrical load in a technical installation, comprising:
   an output terminal for providing a potential;
   a switching element having ON and OFF operating states and a first working contact, via which the potential is connectable to the output terminal;
   an input terminal for receiving an input signal;
   a failsafe evaluation and control unit for controlling the operating state of the switching element in accordance with said input signal; and
   a separator having a connecting piece, a drive element and a separating element;
   wherein the drive element is configured to mechanically move the separating element from a first position into a second position,
   wherein the connecting piece and the first working contact electrically connect in series with one another to electrically connect the potential to the output terminal,
   wherein in the second position the separating element irreversibly separates the connecting piece into two pieces, and
   wherein the safety switching device remains capable of performing a diagnostic function of the technical installation, even after the separator has been triggered.

2. The safety switching device as claimed in claim 1, wherein the drive element moves the separating element from the first position into the second position if the switching element experiences a malfunction.

3. The safety switching device as claimed in claim 1, further comprising an operating power for moving the separating element from the first position into the second position, the operating power being stored in the drive element.

4. The safety switching device as claimed in claim 1, wherein the drive element comprises a fuel and an ignition device.

5. The safety switching device as claimed in claim 1, wherein the drive element comprises a fuel that combusts at a rate that is lower than the sound velocity in the fuel.

6. The safety switching device as claimed in claim 1, further comprising at least a further connecting piece that in the second position of the separating element is irreversibly separated into two pieces.

7. The safety switching device as claimed in claim 1, further comprising at least a second switching element having a second working contact that is connected in series to the first working contact and the connecting piece.

8. The safety switching device as claimed in claim 1, further comprising a further drive element that can move the separating element independently from the drive element.

9. The safety switching device as claimed in claim 1, further comprising a circuit board on which the switching element and the separator are arranged.

10. The safety switching device as claimed in claim 1, further comprising a circuit board having at least a conductor track, wherein the connecting piece is a section of the at least one conductor track.

* * * * *